US005743560A

United States Patent [19]

Jackson et al.

[11] Patent Number: 5,743,560

[45] Date of Patent: Apr. 28, 1998

[54] SPIRAL WRAPPED INNER TUBE FOR GAS GENERATOR FILTER

[75] Inventors: Scott A. Jackson, Centerville; Paul Philpot, Layton; Bradley W. Smith, Ogden, all of Utah

[73] Assignee: Autoliv ASP, Inc., Ogden, Utah

[21] Appl. No.: 723,458

[22] Filed: Oct. 9, 1996

[51] Int. Cl.$^6$ .......... B60R 21/26

[52] U.S. Cl. .......... 280/741

[58] Field of Search .......... 280/741

[56] References Cited

U.S. PATENT DOCUMENTS

| | | | |
|---|---|---|---|
| 4,296,084 | 10/1981 | Adams et al. | 423/351 |
| 5,109,772 | 5/1992 | Cunningham et al. | 102/275.11 |
| 5,230,726 | 7/1993 | Smith et al. | 55/487 |
| 5,308,370 | 5/1994 | Kraft et al. | 55/487 |
| 5,340,150 | 8/1994 | Harada et al. | 280/741 |
| 5,382,415 | 1/1995 | Kishimoto et al. | 280/741 |
| 5,419,578 | 5/1995 | Storey et al. | 280/741 |

*Primary Examiner*—Kenneth R. Rice

[57] ABSTRACT

An improved method for the fabrication of filter assemblies for use in automotive air bag inflators by spirally winding a hollow cylindrical combustion screen comprised of layers of filter material. The spirally wound filter is then cut into individual units of desired length by the use of a conventional cutting device and additional filtering layers can optionally be added to form an inflator filter assembly.

5 Claims, 4 Drawing Sheets

21 20 4 4 21 ℓ'

40
41
42
43
44
45
46
47
48

SPIRAL WRAPPED INNER TUBE FOR GAS GENERATOR FILTER

BACKGROUND OF THE INVENTION

Field of the Invention

This invention relates generally to inflatable type modular occupant restraint systems for passenger vehicles, or, as they are more commonly known, air bag restraint systems. More particularly, this invention relates to an improved, rigid filter assembly for use in a pyrotechnic air bag inflator and a particular wrapping method for manufacturing the filter assembly. The filter functions to cool the hot gases before they reach the air bag and serves to trap particulates and residues generated during combustion so that they do not enter the air bag and contaminate the vehicle.

The present invention is related to the convoluted wrap cylindrical filter assembly described in copending application Ser. No. 08/248,939, filed May 25, 1994 assigned to the assignee of the present invention, wherein the inner core member and additional layers of filter material are radially wrapped. A convoluted wrap cylindrical filter assembly is disclosed in Kraft, U.S. Pat. No. 5,308,370. In the present description the term convoluted wrap is meant to define such radially wrapped filters. The present invention differs from these convoluted wrap filters in requiring that the inner core is formed by a spiral wrapping operation.

The consistent and economical manufacture of filter assemblies for passenger side inflators which efficiently cool and clean gas from the gas generant is of prime concern. This is particularly significant in view of the fact that passenger side inflators vary greatly in size, and, hence, the filter element is strongly dependent on the geometry of the automobile's interior and therefore varies significantly from automobile to automobile.

The use of spiral wrapping to manufacture air bag inflator filter assemblies is disclosed in Smith et al, U.S. Pat. No. 5,230,726 assigned to the assignee of the present invention. Said invention relates to a method for continuous fabrication of filter assemblies for use in automobile air bag inflators comprising spirally winding a first gas permeable support material, which material is flexible, around a rotating mandrel to form a hollow cylindrical core having internal and external surfaces, spirally winding a filter layer outwardly of the hollow cylindrical core, and finally spirally winding at least an outer layer outwardly of the filter layer.

SUMMARY OF THE INVENTION

An object of the invention is to provide an improved method of manufacturing an air bag inflator assembly which results in a filter which reduces the internal pressures of the inflator. Another object of this invention is to provide an improved method for manufacturing air bag inflator filter units which reduces the cycle time required for manufacturing a filter assembly for a passenger side, driver or side air bag inflator over current "one at a time" methods practiced in the art. A further object of the invention is to provide an improved method of manufacturing air bag inflator filter components which provides for rapid change in the length of the filter assembly. A still further object of the invention is that unlike the convoluted wrap there are no terminating ends or bumps within the core which results in excellent wall thickness, roundness and diameter characteristics.

These objects have been achieved by an improved method for the fabrication of combustion inner tubes for use in passenger automotive air bag inflator filters by spirally winding a hollow cylindrical core of metal mesh material and, when desirable, adding spiral wraps of additional layers of said material to form a spirally wound combustion inner tube. The spirally wound combustion tube is then cut into individual components of desired length by the use of a conventional cutting device. Additional overlapping filter layers can be optionally wrapped around the thus formed combustion tube to form the inflator filter assembly.

The materials used for making the various layers of the filter assembly are those materials generally described in the aforementioned copending application Ser. No. 08/248,939 the disclosure of which is incorporated by reference/herein. By way of illustration, the inner core member can be constructed from sheet comprising 30×30 mesh carbon steel wire cloth. The additional filter materials can comprise 18×18 mesh carbon steel wire cloth, ceramic filter paper such as that manufactured by Lydall Corp. and fine filter media made of 45×170 mesh stainless steel.

It is to be further understood that stainless steel wire cloth or other materials e.g. aluminum, copper, etc., could be used in place of carbon steel wire cloth or expanded metal filter materials could be used for making the filters. Different commercially available ceramic compositions could be used in place of the Lydall ceramic paper, such as ceramic textiles. Further, the fine screen filter element could be made of carbon steel, fine expanded metal, steel wool, or woven ceramic textile materials in keeping with the spirit of the invention.

Expanded metal filter media contemplated for use in the present invention can be obtained from Exmet Corporation and is formed by simultaneously slitting and stretching using shaped tools which determine the form and number of openings. A 30×30 mesh replacement using Exmet expanded metal would be specified as 8 Fe 10-5/OHXF with 42% open area. A 45×170 mesh replacement using Exmet expanded metal would be specified as 8 SS 15-5/OHXF with 13% open area. The expanded metal is identified by reference to sheet thickness in mils, metal, strand width in mils and mesh or tool designation.

BRIEF DESCRIPTION OF THE DRAWINGS

With this description of the invention, a detailed description follows with reference being made to the accompanying figures of drawings, which form part of the specification, and of which.

DETAILED DESCRIPTION OF THE INVENTION

Figure 1:
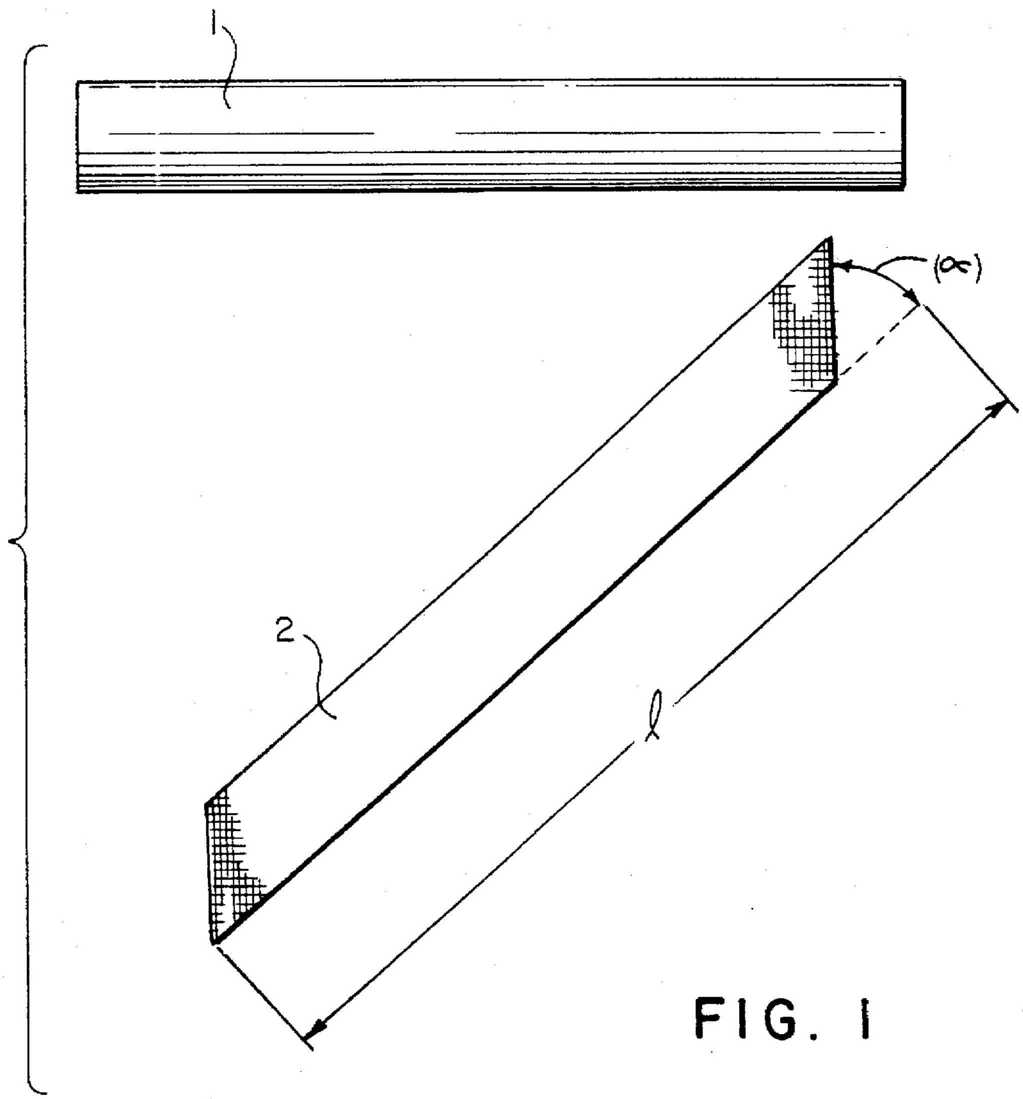
FIG. 1 and FIG. 2 illustrate a manual method for making a spirally wrapped combustion filter.
Figure 2:
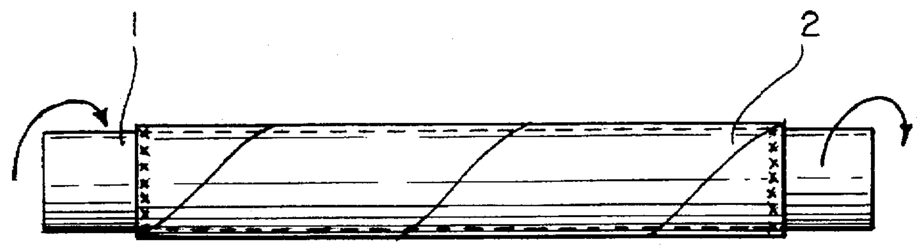
Figure 3:
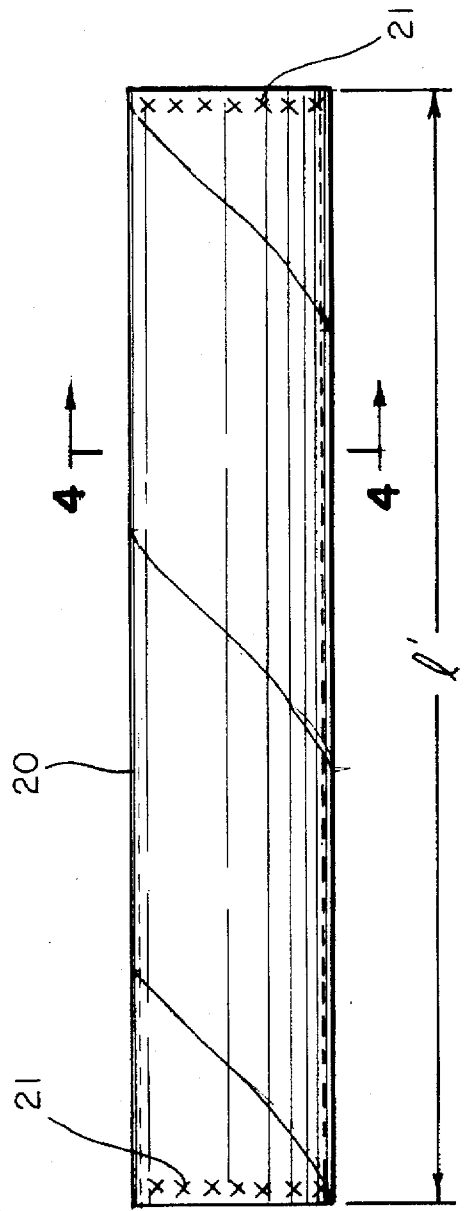
FIG. 3 is a side view of the filter assembly shown in FIG. 1.
Figure 4:
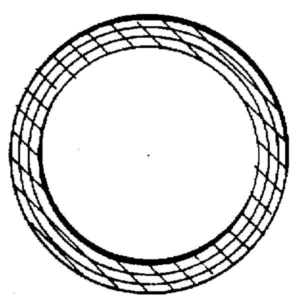
FIG. 4 is a cross-section view of the wrapped filter assembly shown in FIG. 3.

The following preferred manual procedure was employed in wrapping the spiral filter as shown in FIG. 1 and FIG. 2. Three inch strips of wire mesh or expanded metal were cut to length with the ends being cut at the appropriate angle to meet the desired tube diameter. The three inch strips of wire mesh were cut according to the following schedule:

2 strips 30 mesh—20 in. length (l), 50°=alpha 1 strip 30 mesh—20 in. length (l), 53°=alpha 2 strips 18 mesh—25 in. length (l), 55°=alpha The 30 mesh combustion filter tube was formed by manually wrapping three layers 2 of wire cloth or expanded metal on mandrel 1. The wraps were circumferentially welded at 0.25 in. spacings 0.25 in. in from the tube ends. The wraps are also helically welded to prevent the filter tube from unraveling. Using the spiral wrap concept, the tube is wrapped with as many layers as are required wherein the different layers are hand fed onto a rotating mandrel at an angle such that the wrap grows linearly as the mandrel rotates. The tube is then removed from the mandrel and cut into the desired individual filter lengths. FIG. 3 illustrates a finished passenger-side combustion filter cut to the desired length l', with welds 21 at the tube ends, and FIG. 4 illustrates a cross sectional view of the combustion filter of FIG. 3 comprised of three layers. Filter 20, as illustrated in FIG. 3, has an inside diameter of 1.433 in. and an outside diameter of 1,590 in. The dimensions of the filter are merely illustrative and, of course, will vary depending upon the design requirements for the inflator. Optional outer layers can then be radially wrapped about the combustion tube in a conventional manner, such as described in copending application Ser. No. 08/248,939 which wrapping method is incorporated by reference herein.

Testing has been performed in order to compare the performance of the spiral combustion screen filters of the present invention with conventionally wrapped and complete spiral filters. Tank pressures and ignition delays were found to be comparable for most of the configurations. The best results with respect to residue weights appear to be from the present invention with three (3) wraps of 30×30 mesh wire cloth, however all the results are encouraging except those for the complete spiral filter. This is most likely due to the 45×170 mesh filter material and the difficulty in getting a good seal on this filter when wrapping. Of particular interest were the results from using expanded metal cloth because of the cost advantage of the expanded metal over the screen. It is believed that expanded metal would also be advantageous from a manufacturing standpoint due to its increased rigidity and lack of uncertainties due to "nesting" it would be easier to hold the required tolerances during wrapping. The test results show that the use of spirally wrapped combustion screen in accordance with the present invention is a viable option to cutting filter cost while equalling and/or improving upon the current design.

In the test samples 30×30 mesh and 58% open area expanded metal sheets were employed for constructing the inner core and 18×18 mesh, and filter paper materials were used for the additional filter materials. However, different meshes, number of wraps and/or additional or alternative materials could be used in the filter assembly to tailor the performance to a given need. For example, the function of the inner tube support takes place at three different times. During manufacture of the filter assembly, the tube supports the wraps of filter material which surround it. During the expected lifetime of the inflator the inner tube additionally supports the generant contained within it. During function of the inflator, the inner tube supports and contains the slag which is generated as a product of combustion. Accordingly, the number of wraps and the mesh count of the wire cloth filtering medias could be varied to increase or decrease the structural characteristics of the filter assembly. For example, additional wraps or larger wire diameters could be used to increase the strength of the filter assembly. Also the number of wraps or the mesh count of wire cloth filtering medias could be varied to increase or decrease the cooling characteristics of the filter assembly. For example, additional wraps, smaller weave or larger wire diameters would increase cooling of the gas. The number of wraps or the mesh count of the 45×170 mesh metal woven cloth or the filter paper could be changed to increase or decrease the filtering and cooling characteristics of the filter assembly. For example, additional wraps or smaller weave of wire cloth would improve the filtering ability of the assembly.

Figure 5:
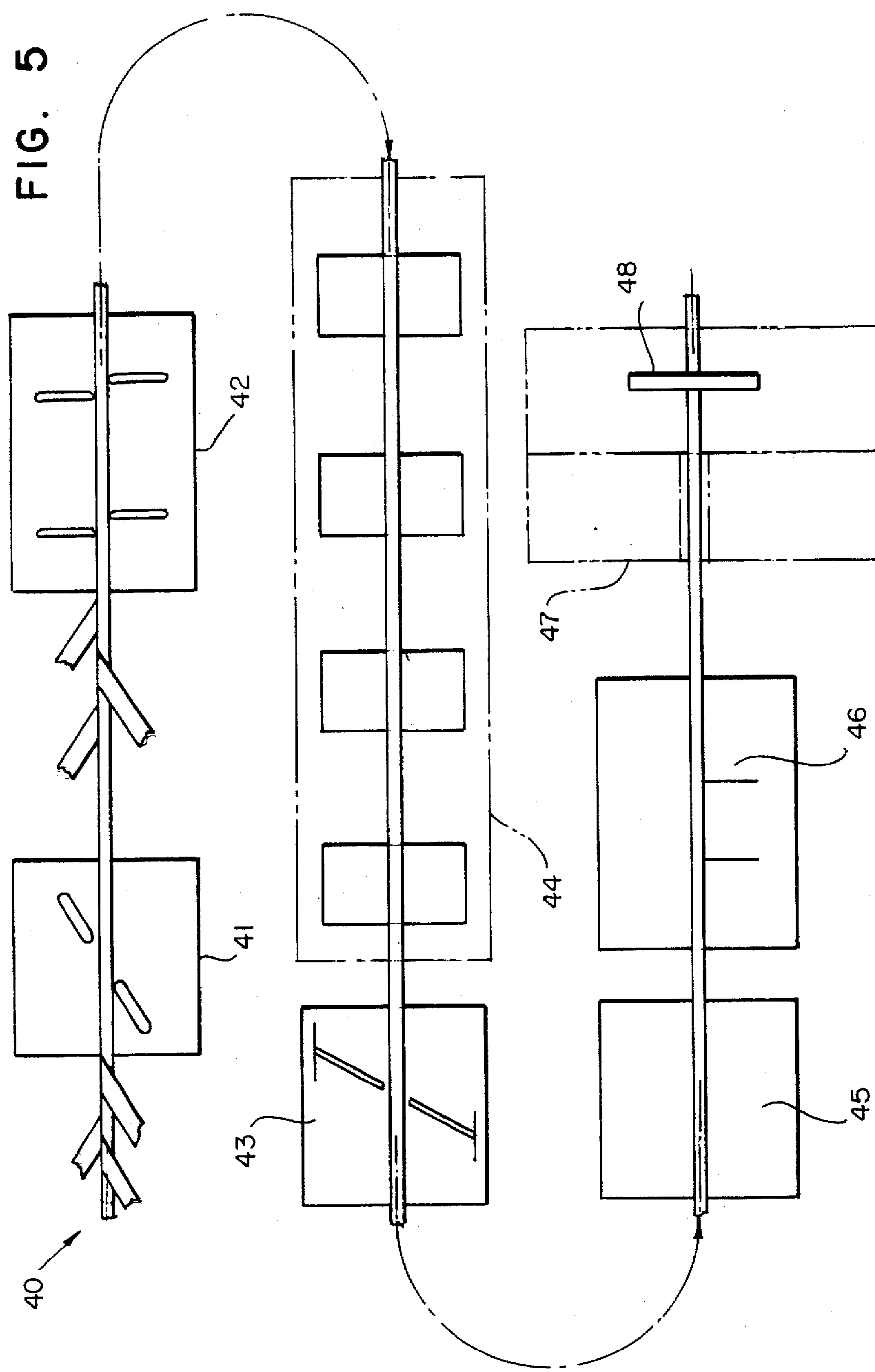
FIG. 5 is a plan view illustrating the continuous manufacture of a spiral (helical) wrapped filter inner core unit.

Though a manually operated method for spirally winding the inner core has been described, it is also contemplated that the filter assembly can be constructed in a continuous manner as hereafter generally described. FIG. 5 generally shows a continuous operation comprising a work cell 40 for the continuous fabrication of a spiral inner combustion filter of an air bag inflator filter according to the present invention. This work cell produces spiral inner tube filters that are comprised of two to six layers of various grades of wire cloth, e.g. 18×18 mesh, 30×30 mesh, etc. or expanded metal. The wire cloth is received in the form of multiple horizontal rolls stacked with the "eye of the core to the sky" and loaded onto horizontal payout reels by a lift truck in a conventional manner. A shear and welding machine (not shown) splices the head and tails of the rolls together as needed, eliminating scrap and repeating the initial set up sequence. Wire cloth is fed through conventional back-tension rolls onto the mandrel (not shown) with their respective helix angle. Optional vertical strip accumulators (not shown) positioned between the horizontal payout reels and the back-tension rolls can also be employed in a conventional manner to eliminate down time while splicing the head and tails together.

Seam welders 41 and 42 are positioned between the entry position of the wire cloth and the drive mechanisms. The first seam welder 41 joins the first three layers on a given helix angle. A second optional flying seam welder 42 can be used to weld the ends of the filter together at the appropriate parting positions. Further, additional welders may be needed between the entry positions of the wire cloth to weld the first, second and third layers of wire cloth together in a six layered filter.

The drive mechanism is designed to grip the wire cloth and pull it linearly one material width for every one revolution. A "Keyence" laser beam 43 is used to gauge the outside diameter on the fly with full stastical process control (SPC) capability. Manual or automatic adjustments will be made to the back-tension material rolls (rotary drives) 44 to control outside diameter. The inside diameter, of course, is controlled by the diameter of the mandrel used to support the filter (not shown). A flying cut-off station 46 is employed to cut the filter to desired length. The filter is advanced via packout station 47 to a stripper 48 where the filter is stripped from the mandrel. An additional inspection position 45 can be provided for other quality checks, such as eddy current.

The wire cloth layers are preferably wrapped in the order shown in FIG. 5 by alternating the wrap direction with each layer while maintaining the same spiral direction for each layer. Such wrapping sequence reduces the coning of the combustion tube. Either a butt or overlap joint can be provided.

Figure 6:
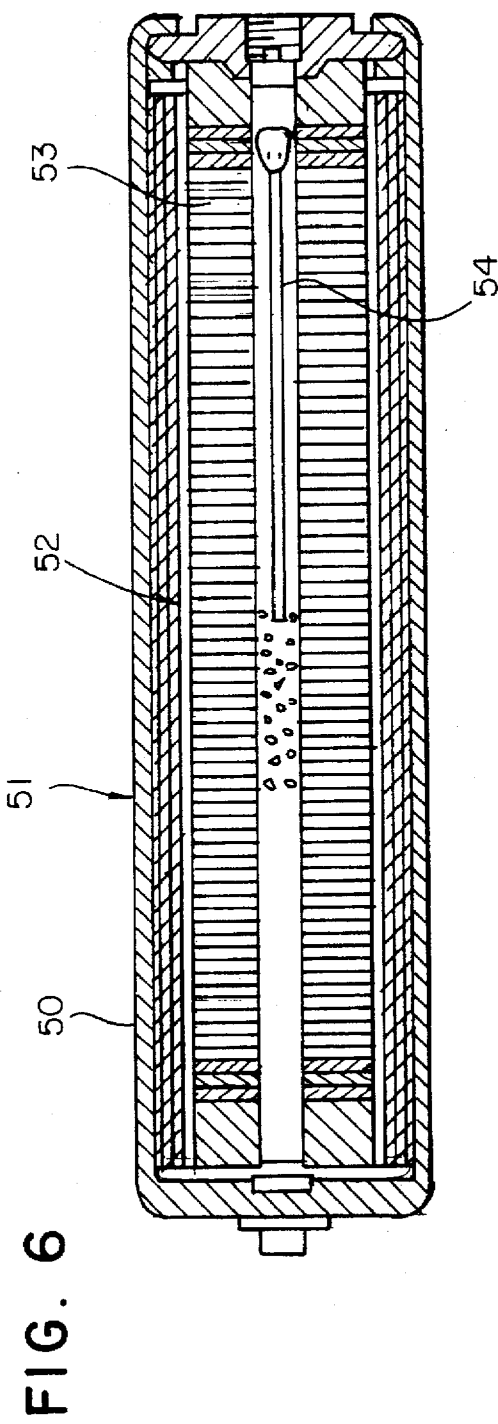
FIG. 6 is a fragmented view illustrating the placement of the filter unit in a passenger side automotive air bag inflator.

The inflator can be any of a number of known constructions, including the passenger side inflator construction illustrated in U.S. Pat. No. 4,296,084 to Schneiter, which patent is assigned to the assignee of the present invention. FIG. 6 is illustrative of an advanced passenger inflator which includes generally an outer housing 51 into which is inserted the wound filter unit 52 of this invention. An igniter 54 containing igniter material and the appropriate ignition system is then inserted into the central region of the inflator 50. While FIG. 6 shows loading the generant 53 directly into filter unit 52, a basket (not shown) can be used for holding the generant. The inflator is then sealed in a conventional manner known to those in the art. The described widths and wrap angles are given for illustration purpose only and are not limitations on the invention. Wire cloth widths from one to three inches and various wrapping angles are generally employed. Of course, the width and angle of the strips depends upon the desired configuration of the filter assembly. It is contemplated that the spiral wrap concept of the present invention could be used in manufacturing passenger, driver and side inflator systems.

Figure 7:
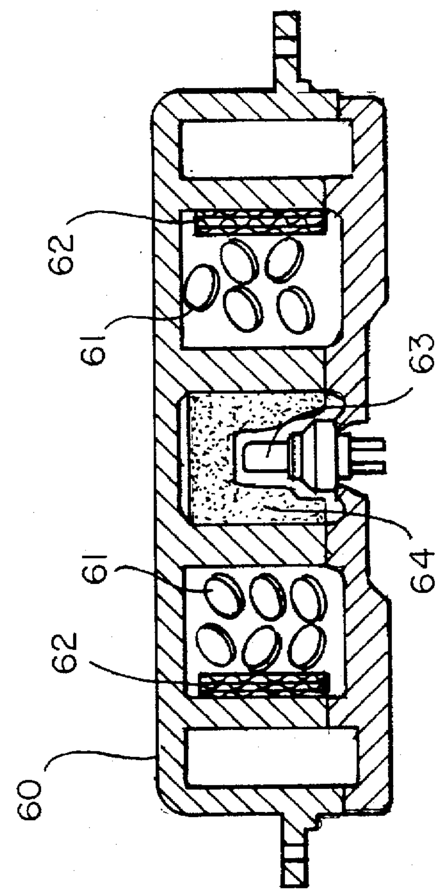
FIG. 7 is a cross-section view of a driver-side inflator.

In a further embodiment of the invention, the spirally wrapped hollow cylindrical combustion filter assembly of the invention comprising at least one layer of filter media cut to the required length can be employed in a driver's side inflator for supporting the gas generant without the need for a perforated basket or additional convoluted filter layers. In such driver side inflator applications, the hollow cylindrical combustion filter is coaxially arranged in the combustion chamber of the inflator and the gas generant is loaded in direct contact with the combustion filter. This construction would offer the same advantages in that there would be no bulges or bumps and this would allow the filter assembly to meet the close tolerances associated with driver side inflators. FIG. 7 illustrates such a driver-side inflator embodiment.

FIG. 7 shows a driver side inflator 60 of general construction wherein the gas generant 61 is loaded into direct contact with the spirally wrapped combustion screen 62 of the present invention. The inflator 60 includes means comprising initiator 63 and igniter 64 for igniting gas generant 61. A driver side air bag inflator which could be used in practicing the present invention is disclosed in U.S. Pat. No. 5,419,578, which is assigned to the assignee of the present invention.

With the description of the invention in detail, those skilled in the art will appreciate that modification may be made to the invention without departing from the spirit thereof. Therefore, it is not intended that the scope of the invention be limited to the specific embodiments that have been illustrated and described. Rather, it is intended that the scope of the invention be determined by the scope of the appealed claims.

What is claimed is:

1. An inflator assembly of a filter device and tubular gas generator, said gas generator comprising a filter device coaxially arranged within an outer perforated tube, sealing means for sealing each axial end of said outer tube, a gas-generating material contained within and in contact with said filter device and means for igniting the gas generating material to generate pressurized gases, said filter device being arranged within said outer tube to filter the gases, retain the slag during combustion of said gas-generating material, and support the gas generating material during the expected lifetime of the inflator, said filter device comprising a filter element composed of multiple roll formed layers of filter material, said filter element being constructed in the form of a hollow cylindrical roll having a spirally wound inner core member and additional layers of filter material radially wrapped coextensively with the length of said inner core member.

2. An assembly according to claim 1, wherein said inner core is composed of three layers of 30×30 mesh woven metal cloth.

3. A driver-side inflator assembly of a tubular combustion screen and gas generator housing having multiple concentric chambers, a gas-generant material contained within one of said chambers and in contact with said combustion screen and means for igniting the gas generating material to generate pressurized gases, said combustion screen being arranged within said housing to filter the gases, retain slag during combustion of said gas-generant material and support the gas-generant material during the expected lifetime of the inflator, said combustion screen comprising an inner core of one or more layers of spirally extending wrapped metal wire cloth or expanded metal cloth and additional layers of filter material radially wrapped coextensively along the length of said inner core.

4. The assembly according to claim 3 wherein the combustion screen is composed of up to six layers of 30×30, 24×24 or 18×18 mesh wire cloth or expanded metal or combination thereof.

5. The assembly according to claim 4 wherein the combustion screen is formed of three layers of expanded metal cloth or metal wire cloth.

* * * * *